United States Patent [19]

Chan

[11] Patent Number: 4,680,670
[45] Date of Patent: Jul. 14, 1987

[54] FAIL SAFE CERAMIC CAPACITOR

[75] Inventor: Ning-Huat Chan, Myrtle Beach, S.C.

[73] Assignee: AVX Corporation, Great Neck, N.Y.

[21] Appl. No.: 912,255

[22] Filed: Sep. 29, 1986

[51] Int. Cl.[4] .......................... H01G 1/11; H01G 4/10
[52] U.S. Cl. ..................................... 361/275; 361/321
[58] Field of Search ............... 361/328, 329, 303–305, 361/308–310, 273, 275, 277, 321

[56] References Cited

U.S. PATENT DOCUMENTS 3,118,095  1/1964  Baron et al. ......................... 361/308
4,433,359  2/1984  Hamabe et al. ..................... 361/273

FOREIGN PATENT DOCUMENTS 705353  3/1954  United Kingdom ................ 361/273

*Primary Examiner*—Donald A. Griffin
*Attorney, Agent, or Firm*—Arthur B. Colvin

[57] ABSTRACT

A fail safe monolithic ceramic capacitor is disclosed, said capacitor being characterized in that a short circuit between an adjacent pairs of layers of electrode material functions merely to remove the shorted layers from the capacitor circuit leaving a capacitor which is intact but of a lower capacitive value. The capacitor includes a fuse defining a heating element which lies adjacent an external thin band of metal interposed between the fuse and a termination. Any overheating of the fuse results in a melting and shrinkage of the external band of metal with consequent disconnection of the pair of shorted electrodes.

3 Claims, 4 Drawing Figures

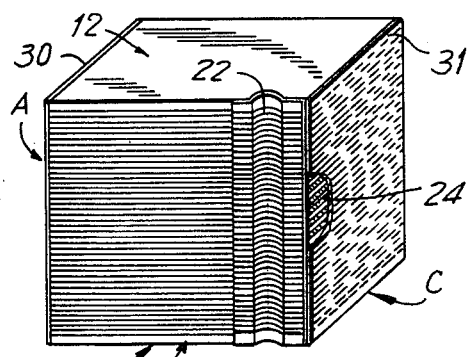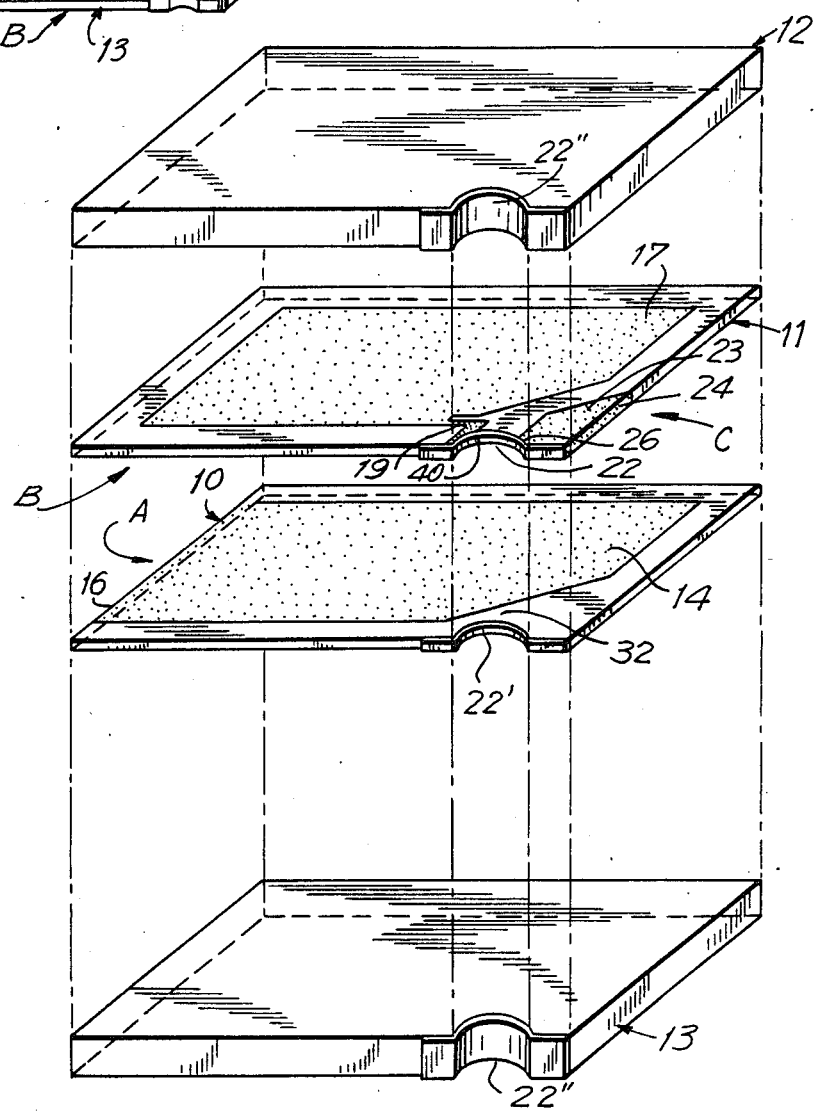

FAIL SAFE CERAMIC CAPACITOR

BACKGROUND OF THE INVENTION

1. Field of the Invention

The present invention is directed to capacitors and relates more particularly to a monolithic multi-layer ceramic capacitor (MLC).

Electronic devices such as computers, television sets, radio transmitting and receiving equipment, and microchip controlled circuits utilize a multiplicity of MLCs. MLCs are frequently employed in the power supply circuits associated with intergrated circuit devices as a means of damping pulses associated with the operation of such devices. MLCs typically comprise a multiplicity of thin layers of ceramic dielectric material with interposed layers of electrode material.

While mass production technics and testing procedures of fabricated MLCs have been devised which minimize the possibility of short circuiting between adjacent layers of electrodes in MLCs, it is not an uncommon experience to find an MLC which is shorted either by virtue of mishandling in application, or by incipient weaknesses in the ceramic layer resulting in shorts after periods of use of the electronic device. When a capacitor short circuits, the resultant uncontrolled electrical flow often causes damage to associated components in the electronic device such that the failure of a capacitor, which is relatively inexpensive, may induce significant and expensive damage to associated components. THE PRIOR ART Various means have been suggested to eliminate or minimize the damages which may flow from ceramic capacitor failures. By way of example, it has been proposed to provide a fuse combined with a monolithic ceramic capacitor (U.S. Pat. Nos. 4,107,759 and 4,193,106). Other examples of fuses embodied in or combined with capacitors of various sorts may be found in the following U.S. Patents:

| | |
|---------|---------|
| 2216558 | 3579062 |
| 2216559 | 3638083 |
| 2704341 | 4107762 |
| 3236976 | 4150419 |
| 3249835 | 4186417 |
| 3579061 | 4442473 |

An alternative approach to the fused capacitor design has been to embody fusing in the printed circuit devices to which the capacitor is attached. Representative examples of prior art patents adopting such approach are:

| | |
|---------|---------|
| 3500276 | 4072976 |
| 3699395 | 4342977 |
| 4042950 | 4394639 |

While the provision of fusing mechanisms as represented by the prior art patents cited above have been relatively effective in protecting equipment associated with the failed capacitor, the diagnosing of such failure and the replacement of the failed capacitor and fuse result in significant down time of the electronic device and the expenditure of significant technician time in effecting repair.

SUMMARY OF THE INVENTION

The present invention may be summarized as directed to a novel monolithic ceramic capacitor characterized in that internal short circuits within the capacitor are self correcting in the sense that a short circuit between adjacent layers results merely in a miniscule variation of the value of the capacitor but does not require replacement of the capacitor. The device of the present invention is further advantageous in that even if a complete capacitor failure is encountered, the capacitor will fail "open" whereby associated components are protected against damage, rather than "short" with consequent flow of excessive current.

More particularly, the present invention is directed to improvements in MLCs wherein a short between a pair of adjacent layers of electrodes will result in removing the pair of shorted electrode layers from the circuit without removing the entire capacitor from the circuit. Unless a significant number of pairs of electrode layers are involved, the loss of capacitance will not interfere with the proper operation of the device unless of course the capacitor is in an area of the circuit in which a precise capacitance value must be maintained.

Still more particularly, the present invention relates to an MLC comprising a multiplicity of layers of ceramic dielectric material between which layers are disposed layers of electrode material. Alternate electrode layers extend to a first face of the capacitor and such alternate layers are electrically connected by a termination on such first face of the capacitor in the usual manner. The intermediate layers, i.e. the layers between the alternate electrodes include a major electrode area and a reduced cross section area or fuse portion extending from the major electrode area.

The intermediate electrode layers include in addition, a contact portion electrically connected to the reduced cross section area or fuse portion and exiting on a second face of said capacitor and a tab portion spaced from said contact portion, said tab portion exiting at a third face of said capacitor and also exiting at said second face of said capacitor in proximate spaced relation to the exit portion of the contact portion.

A second termination is formed on the tab portions exiting on the third face of the capacitor. The exiting portions of the tab portion on the second face of the capactior are electrically connected to the exiting portions of the contact portions by a very thin band of low melting point metal deposited on the second face of the capacitor in bridging relation of the space between the exit portions of the contact portions and the tab portions.

With the described construction, if a pair of layers of electrode material of opposite polarity are shorted one to the other, as might result if a pinhole is formed in a stratum of dielectric there between, a high current will flow through the associated reduced cross section area or fuse portion which flow will result in an overheating of the reduced cross section area with consequent melting and opening of the bridging band linking the associated exit portions of the contact portions to the tab portion. In such event, the pair of electrode layers which are shorted to each other are removed from the circuit while permitting the remaining pair of layers of the capacitor to function in a normal manner. While the net result of the removal of such pairs of layers results in a slight reduction of capacitance, tolerance of the circuitry with which such capacitors are typically employed is normally sufficiently wide to permit the continued functioning of the circuitry.

It is accordingly an object of the invention to provide a fail safe capacitor. A further object of the invention is the provision of a fail safe capacitor characterized in that a short circuit between a pair of electrode layers will normally result in a removal of the respective pair of layers from the circuit with resultant partial loss of capacitance, the capacitor however still functioning in an acceptable manner. Still a further object of the invention is the provision of an MLC having internal means which, in the event of capacitor failure, will not result in a short circuit throughout the entire capacitor.

In order to obtain these objects and such further objects as may appear herein or be hereinafter pointed out, reference is made to the accompanying drawings in which:

FIG. 1 is a perspective view of a capacitor according to the invention.

FIG. 2 is an exploded diagramatic perspective view of the capacitor.

Figure 3A:
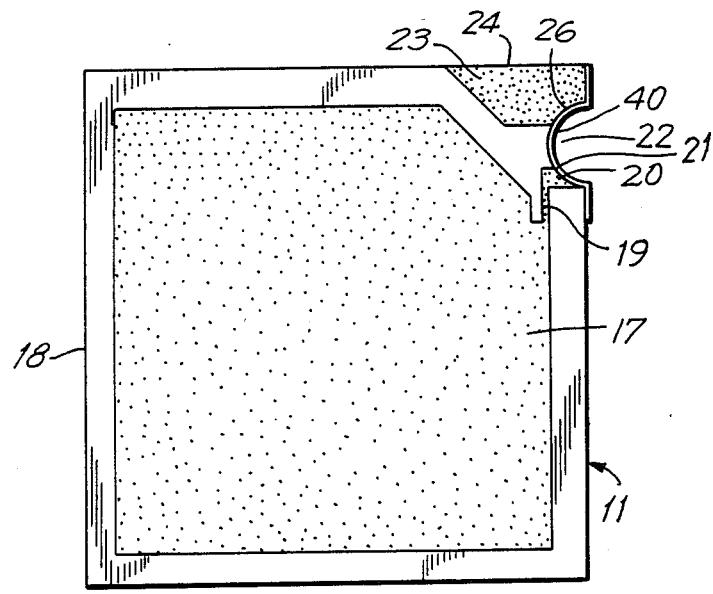
FIGS. 3a and 3b are plan views respectively of alternate layers of a capacitor formed in accordance with the invention.
Figure 3B:
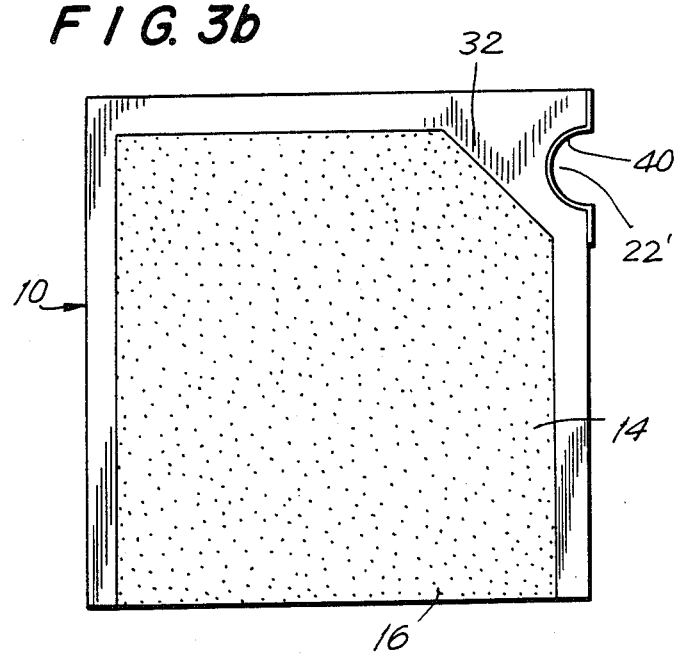

Referring now to the drawings, there is shown diagramatically in FIGS. 1 and 2 a monolithic ceramic capacitor which is comprised of a multiplicity of ceramic dielectric layers 10 carrying electrodes 14 of a first polarity, and a second multiplicity of ceramic dielectric layers 11 carrying electrodes 17 of opposite polarity. As will be understood by those skilled in the art, a multiplicity layers 10 and 11 are embodied in each capacitor, the layers alternating. Typically an uppermost and lowermost layer 12 and 13 of ceramic dielectric material may be disposed at the top and bottom of the stack of active layers 10 and 11. As best appreciated from FIG. 3b, the layers 10 have screened thereon the electrode pattern 14 covering a major portion of the surface thereof. The electrode pattern 14 is recessed from the margins of the dielectric layer 10 except at the edge 16 of the layer at a first face A of the capacitor where the edges 16' of the electrode patterns 14 are exposed.

The layers 11 likewise include electrode pattern 17 covering the major surface thereof. The eletrode material 17 screened onto the layer 11 includes a reduced cross section area 19, integral with a slightly enlarged portion 20 exiting at 21 at a second face B of the capacitor, illustrating but not necessarily in a grooved area 22 formed in the dielectric layer 11. The pattern of electrode material applied to the layer 11 includes, in addition, a contact tab member 23 having an edge 24 exiting at the third face C of the capacitor. In addition, the tab 23 includes a secondary exposed edge 26 exiting in the groove 22. As will be observed from FIG. 3A, the exit portion 21 of the portion 20 is spaced from the exit portion 26 of the tab 23.

As will be appreciated by workers in the relevant art, the capacitor is comprised of a multiplicity of stacked layers 10 and 11 alternated as shown clearly in FIGS. 1 and 2. The layers as noted previously may be encompassed within upper and lower ceramic cover layers 12 and 13.

The capacitor is terminated by the application in any conventional manner of a conductive layer 30 on face A of the capacitor, over the entirety of the edges 16 of the stacked layers, whereby the termination 30 will electrically connect all of the edges 16 to each of the electrodes 14 on the layers 10.

In similar manner, the exit edges 24 of the layers 11 on face C of the capacitor are terminated with a conductive layer 31 which is in electrical contact with all of the edges 24 of the tabs 23. As will be apparent from the foregoing, the electrode areas 17 of the layers 11 remain electrically isolated from the tabs 23 of layers 11.

An electrical connection is formed in the grooves 22 between electrode portions 20 and tabs 23 by the application in each such groove 22 of an extremely thin layer or film of low melt metal 40 in contact with edges 21 and 26, a preferred metalic material being comprised of zinc or aluminum. Optionally but preferably, the metal is applied by a sputtering procedure and may comprise a thickness of about 0.4 μm.

As will be apparent from an inspection of the figures, each of the layers 10 also has a groove 22' aligned with grooves 22 and the electrode material 14 screened on layer 10 includes a recessed portion 32 whereby the electrodes 14 are spaced from the groove 22.

The layers 12 and 13 may also have grooves 22'' aligned with grove 22 and 21'. The aligned grooves 22, 22', and 22'' all are coated with the film 40.

With limitation and in order to comply with the requirements of the patent laws, a preferred example of the electrode material is a material formed from a screened ink including a paladium base, the paladium being and mixed with solvents and organic filler materials. A suitable electroding ink is sold by Dupont E.I. de Nemours & Co., Inc. under the trade name and catalog designation of Thick Film Electrode Paste 4810 D. The electroding material is screened onto the various layers so as to define a thickness, after firing, of approximately 4 μm.

The reduced cross section portion 19 of the electrode 17 functions as a heater and also as a fuse and is preferably approximately 4 mils in width and approximately 20 mils in length, a component thus dimensioned providing a resistance of approximately 1 ohm.

The operation of the capacitor will be readily understood from the foregoing description. The capacitor is introduced into the desired circuits frequently as a shunting capacitor in a power supply circuit, by connections effected to the terminations 30 and 31. The termination 31 makes electrical contact to the electrode members 17 by a circuit running through tabs 23, through exit portion 26, the bridging portion of the sputter coating 40 and thence to exit portion 21 and to the reduced cross section area 19. While the reduced cross section areas 19 taken individually provide a significant ohmic resistance, it will be understood that the resistances of the various layers are paralleled, and thus their combined resistance is inconsequential.

In the event of a shorting between the electrodes 14 and 17 of a pair of adjacent layers, such shorting being the result perhaps of a pinhole in the ceramic dielectric material separating such electrodes, it will be apparent that the current flow in the circuit between terminations 30 and 31 will increase drastically to a value dependent upon the circuit configurations and parameters within which the capacitor is employed. The increased current flow will result in a rapid heating of the associated reduced cross section area 19 which heating will be communicated to the closely adjacent bridging portion of the thin metalic coating 40 formed in groove 22. The heat thus generated will result in a localized melting of the bridging portion 40 at an area of the groove in registry with the heated reduced cross section area 19 and possibly also of the associated fuse area 19. Melting of the bridging band 40 in groove 22 will cause the band to retract under the influence of surface tension, from the area between exit portions 26 and 21, opening the current there between. The melting and retraction of the coating 40 in the affected area will result in removing from the electrical circuit the pair of electrode layers 14 and 17 which are shorted. Accordingly, the net result of the short circuit will be to reduce the capacitance of the MLC to a degree dependent upon the number of electrodes removed from the circuit. Accordingly, the device will still present a capacitance across the power supply at a slightly lowered capacitance. In this context it should be recognized that a typical monolithic ceramic capacitor may include 50 or more electrode layers, and accordingly, the removal of several such layers will not materially reduce the capacitance of the device.

Importantly, a capacitor in accordance with the present invention will not provide a direct closed or shorting circuit, but will either merely be reduced in capacitance or, in the event of a gross failure, will fail in an "open" condition whereby the likelihood of damage to associated components is minimized.

A capacitor in aaccordance with the invention will not introduce a material resistance into the circuit in view of the numerosity of the parallel connected reduced cross section areas.

As will be appreciated by workers in the art, the dielectric material of which the capacitor is formed is non-critical and may employ and conventional ceramic compound such as a barium titanate or the like. Similarly, as is conventional, leads may be soldered to the terminations 30 and 31 and the device may be coated with a protective insulating barrier of polymers of various sorts.

As will be apparent to those skilled in the art, numerous variations in details of construction may be made in the instant device without departing from the spirit of the present invention. Accordingly, the invention is to broadly construed within the scope of the appended claims.

What is claimed as new and sought to be protected by Letters Patent of the United States is as follows:

1. A fail safe monolithic ceramic capacitor comprising a plurality of superposed layers of dielectric ceramic material, conductive layers of electrode material interposed between such dielectric layers, alternate said conductive layers extending to a first face of said capacitor, first termination means formed on said first face of said capacitor and electrically connecting said alternate layers, the layers intermediate said alternate layers including a reduced cross section area defining a fuse as well as a discrete conductive tab portion extending to a third face of said capacitor spaced from said first face, said tab portion and reduced cross section area of said intermediate conductive layer having portions exiting at proximately spaced positions at a second face of said capacitor, a band of low melt metal in electrical bridging relation of the respective exiting portions of said tab portion and reduced cross section areas of said intermediate conductive layers, and second termination means on said third face of said capacitor linking said tab portions of said intermediate conductive layers.

2. A capacitor in accordance with claim 1 and including a groove formed in said second face of said capacitor, the exiting portions of said tab portions and said reduced cross section areas being exposed in said groove, said band of low melt metal being disposed within the said groove and electrically connecting said exiting portions.

3. A capacitor in accordance with claim 2 wherein said band of low melt metal comprises zinc, aluminum, antimony lead or any low melting alloy in thickness in the range of from about 0.1 μm to 1.0 μm.

* * * * *